United States Patent
Ito et al.

(10) Patent No.: US 7,137,924 B2
(45) Date of Patent: Nov. 21, 2006

(54) CONTROL SYSTEM FOR HYBRID VEHICLES

(75) Inventors: Masatoshi Ito, Okazaki (JP); Tatsuya Ozeki, Torrance, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 174 days.

(21) Appl. No.: 11/023,596

(22) Filed: Dec. 29, 2004

(65) Prior Publication Data

US 2005/0170929 A1    Aug. 4, 2005

(30) Foreign Application Priority Data

Jan. 22, 2004   (JP)   ............... 2004-014320

(51) Int. Cl.
*B60K 1/02* (2006.01)

(52) U.S. Cl. ............................................. 477/3

(58) Field of Classification Search ............ 477/3, 477/906, 907
See application file for complete search history.

(56) References Cited

U.S. PATENT DOCUMENTS

| | | | |
|---|---|---|---|
| 3,623,568 A | | 11/1971 | Mori |
| 4,531,485 A | * | 7/1985 | Murther ............... 123/196 S |
| 5,934,395 A | | 8/1999 | Koide et al. |
| 6,638,022 B1 | | 10/2003 | Shimabukuro et al. |
| 6,647,326 B1 | | 11/2003 | Nakamori et al. |
| 6,709,362 B1 | * | 3/2004 | Tomohiro et al. ........... 477/3 |
| 6,769,502 B1 | * | 8/2004 | Nakamori et al. ........ 180/65.2 |
| 6,913,558 B1 | * | 7/2005 | Mori et al. ................... 477/3 |
| 7,056,260 B1 | * | 6/2006 | Nakamori et al. ............ 477/3 |
| 2002/0094910 A1 | * | 7/2002 | Endo et al. ................. 477/97 |
| 2003/0064854 A1 | | 4/2003 | Kotani |
| 2003/0078134 A1 | | 4/2003 | Kojima et al. |
| 2004/0084233 A1 | | 5/2004 | Wakuta et al. |

FOREIGN PATENT DOCUMENTS

| | | |
|---|---|---|
| JP | 47-31773 | 8/1972 |
| JP | 2000/230442 | 8/2000 |
| JP | 2002/225578 | 8/2002 |
| JP | 2003/127681 | 5/2003 |
| JP | 2003/130203 | 5/2003 |

OTHER PUBLICATIONS

U.S. Appl. No. 10/855,371, filed May 28, 2004, Nakamori et al.
U.S. Appl. No. 11/023,596, filed Dec. 29, 2004., Ito et al.

* cited by examiner

*Primary Examiner*—Dirk Wright
(74) *Attorney, Agent, or Firm*—Oblon, Spivak, McClelland, Maier & Neustadt, P.C.

(57) ABSTRACT

A control system for a hybrid vehicle, in which an engine is connected to a first motor generator and to an output shaft through a power distributing mechanism, in which a second motor generator is connected to the output shaft through a transmission wherein a torque capacity is varied in accordance with an oil pressure, and which has an electric oil pump for generating an oil pressure to set a torque capacity, comprising: a trouble detecting means for detecting a trouble of the electric oil pump; and an internal combustion engine starting means for starting the internal combustion engine in case the trouble is detected by the trouble detecting means.

21 Claims, 5 Drawing Sheets

(A)

(B)

CONTROL SYSTEM FOR HYBRID VEHICLES

BACKGROUND OF THE INVENTION

1. Field of the Invention

This invention relates generally to a control system for a hybrid vehicle provided with a plurality of prime movers for running a vehicle, and more particularly, to a control system for a hybrid vehicle which has an electric oil pump for generating an oil pressure to set a torque capacity of a power transmission line.

The disclosure of Japanese Patent Application No. 2004-14320 filed on Jan. 22, 2004 including specification, drawings and claims is incorporated herein by reference in its entirety.

2. Discussion of the Related Art

One example of the hybrid vehicle equipped with a "mechanical distribution type drive unit" is disclosed in Japanese Patent Laid-Open No. 2002-225578, and a construction thereof will be described briefly hereafter. In the disclosed hybrid vehicle, an engine torque is inputted to a carrier of a single pinion type planetary gear mechanism which constitute a distributing mechanism, a first motor generator is connected to a sun gear, and an output member such as a counter drive gear etc. is connected to a ring gear. A second motor generator is connected to the output member or the ring gear through a transmission. The transmission is capable of switching a gear stage between a direct gear stage in which the entire transmission rotates integrally, and a low gear stage in which an output speed is lower than an input speed. Those gear stages are set by properly operating an engagement mechanism operated by the oil pressure.

The hybrid vehicle of this kind can be run not only by a motive power of an engine and the first motor generator, but also by using a torque outputted from the second motor generator as an assist torque. Otherwise, it is also possible to be run only by an output torque of the second motor generator.

Also, in Japanese Patent Laid-Open No. 2000-230442, there is disclosed one example of a hybrid vehicle, which is constructed to maintain driving of an engine-driven oil pump by detecting a trouble of an electric pump from a cumulative load of the electric oil pump and a racing condition of the engine, and by inhibiting a halt of the engine when the electric oil pump is under abnormal condition.

In order to secure the oil pressure when the engine is halted, in the hybrid vehicle disclosed in Japanese Patent Laid-Open No. 2002-225578, it is conceivable to further provide an electric hydraulic pump which is capable of generating the oil pressure even when the engine is halted, in addition to a hydraulic pump which is driven by the engine.

In case of running this hybrid vehicle by an electric motor, output torque of the electric motor is transmitted to an output shaft through a transmission. However, since an engine is halted, it is necessary to set the transmission to a predetermined torque capacity by feeding an oil pressure from the electric oil pump. Therefore, in case of running the vehicle as an electric vehicle (i.e., EV running) by an electric motor, if the electric oil pump has some sort of trouble so that an output pressure or a discharge amount of the oil pressure is insufficient, the torque capacity of the transmission becomes zero or insufficient. As a result of this, the output of the electric motor cannot be transmitted to the output member, and this may prevent the running of the vehicle. In addition, the system suggested in Japanese Patent Laid-Open No. 2000-230442 is a system to secure the torque capacity of a transmission for transmitting an engine torque to an output shaft, and this system cannot be applied to hybrid vehicles in which a prime mover other than an engine is connected to the output member through the transmission.

SUMMARY OF THE INVENTION

An object of this invention is to secure a running of a hybrid vehicle having an electric oil pump even when the electric oil pump is under abnormal condition.

Accordingly, a control system of this invention is so constructed as to control a startup of an engine on the basis of a current running state of the vehicle. More specifically, according to the present invention, there is provided a control system for a hybrid vehicle, in which an internal combustion engine is connected to a first electric motor and to an output member through a power distributing mechanism, in which a second electric motor is connected to the output member through a transmission wherein a torque capacity is varied in accordance with an oil pressure, and which has an electric oil pump for generating an oil pressure to set the torque capacity of the transmission, comprising: a trouble detecting means for detecting a trouble of the electric oil pump; and an internal combustion engine starting means for starting the internal combustion engine in case the trouble is detected by the trouble detecting means.

The trouble of the electric oil pump can be judged on the basis of a speed or an abnormality of a current value of the electric oil pump, or an elapsed time from the instant when the trouble has occurred. In case the trouble is detected, it is possible to inhibit the hybrid vehicle from running by a second electric motor.

According to the invention, the internal combustion engine is driven in case the trouble of the electric oil pump is detected. Therefore, it is possible to run the vehicle even when the electric oil pump fails.

In addition to the above-mentioned construction, a control system for a hybrid vehicle of the present invention is characterized by comprising: a mechanical oil pump which is driven by the internal combustion engine, for generating an oil pressure to set the torque capacity of the transmission; and a mechanical oil pump operating means for feeding the oil pressure from the mechanical oil pump to the transmission, in case the trouble is detected by the trouble detecting means.

With this construction, therefore, the oil pressure is fed to the mechanical oil pump connected with the internal combustion engine, even when the trouble of the electric oil pump is detected. Accordingly, it is possible to continue to feed the oil pressure even if the electric oil pump fails.

In addition, the internal combustion engine starting means may include a cranking means for cranking the internal combustion engine by the first electric motor, and a torque output control means for outputting a torque by the second electric motor while the oil pressure of the transmission is higher than a preset value.

With this construction, therefore, a reaction force of the first electric motor at the cranking time of the internal combustion engine is countervailed by the second electric motor, while the oil pressure of the transmission is higher than the preset value. Accordingly, it is possible to suppress the torque to be transmitted to the output member at the cranking time.

In addition to any of the above-mentioned construction, a control system for a hybrid vehicle of the present invention can further comprise a starting propriety determining means for determining to allow or not to allow startup of the internal combustion engine on the basis of the vehicle speed.

According to the invention, therefore, the determination to allow or not to allow startup of the internal combustion engine is made on the basis of the vehicle speed. Accordingly, it is possible to start the internal combustion engine at the vehicle speed in which torque fluctuations are not felt easily.

The starting propriety determining means may be a means for inhibiting the cranking at a low vehicle speed, and for allowing the cranking at a high vehicle speed.

With this construction, therefore, the internal combustion engine is inhibited from driving at a low vehicle speed, and is driven at a high vehicle speed. Accordingly, it is possible to start the internal combustion engine when the vehicle speed is high so that the torque fluctuations are not felt easily.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 3:
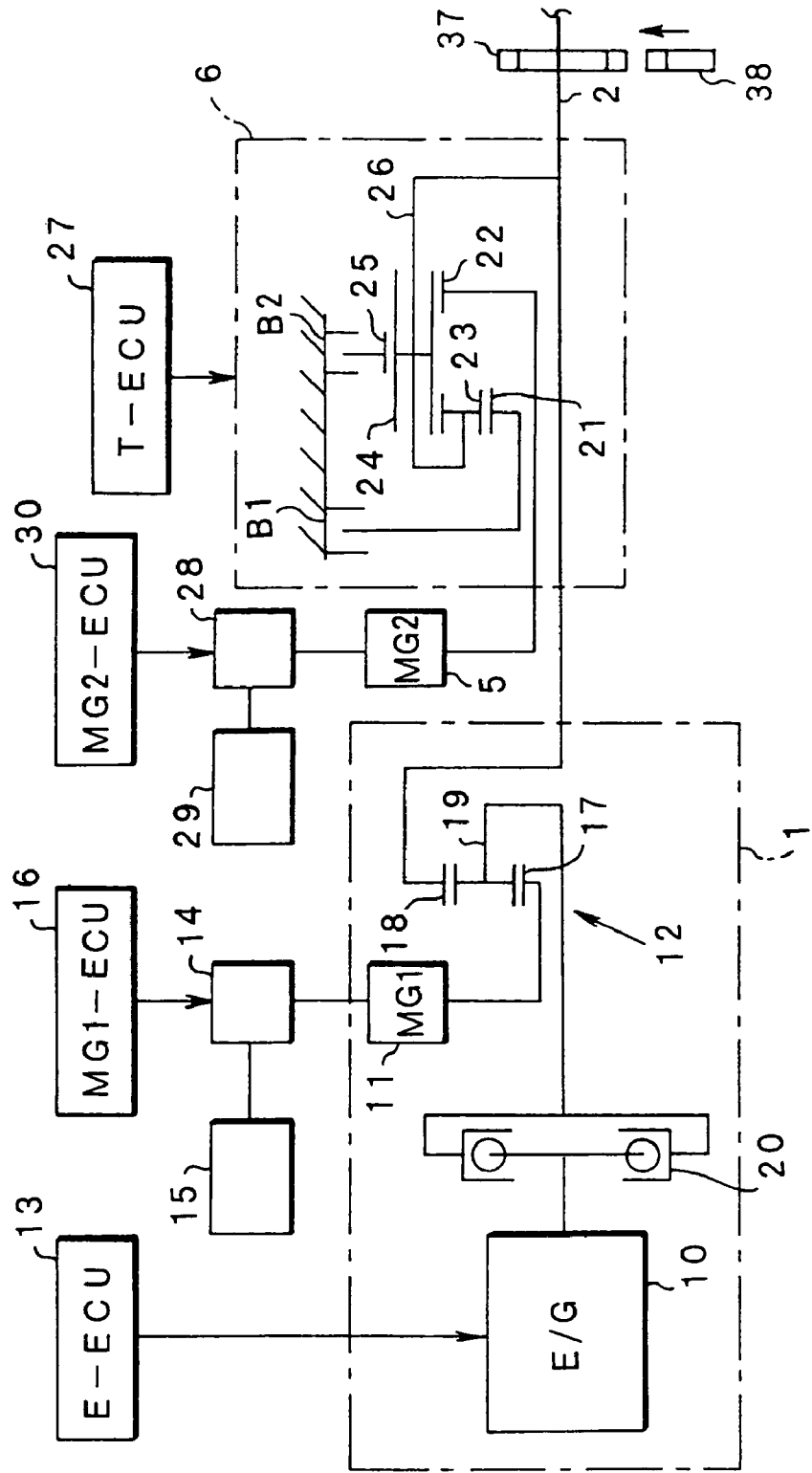
FIG. 3 is a skeleton diagram showing the drive unit of the hybrid vehicle to which the invention is applied.
Figure 4:
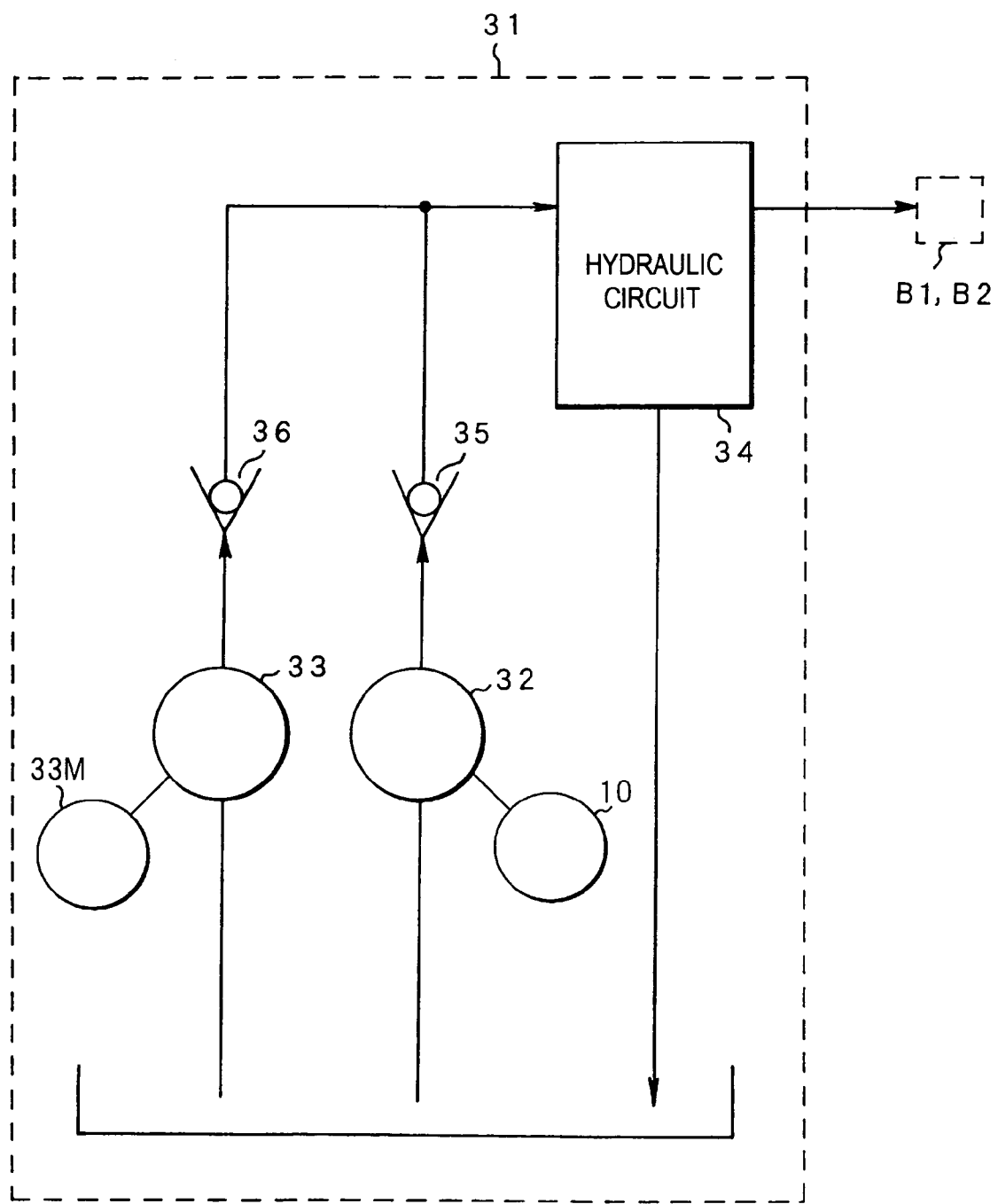
FIG. 4 is a diagram for explaining a connecting relation between a mechanical oil pump and an electric oil pump in a hydraulic control system.

This invention will be described in connection with its specific examples. The first description is made on a drive unit of a hybrid vehicle, to which is this invention is applied. In the hybrid drive unit or an application target of this invention, as shown in FIG. 3, the torque of a main prime mover 1 (i.e., a first prime mover) is transmitted to an output member 2, from which the torque is transmitted through a differential 3 to drive wheels 4. On the other hand, there is provided an assist prime mover (i.e., a second prime mover) 5, which can make a power control to output a driving force for a drive and a regenerative control to recover an energy. This assist prime mover 5 is connected through a transmission 6 to the output member 2. Between the assist prime mover 5 and the output member 2, therefore, the transmission torque capacity is increased/decreased according to a gear ratio to be set by the transmission 6.

This transmission 6 can be constructed to set the gear ratio at "1" or higher. With this construction, at the power running time for the assist prime mover 5 to output the torque, this torque can be outputted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

The aforementioned hybrid drive unit will be described more specifically. As shown in FIG. 3, the main prime mover 1 is mainly constructed to include an internal combustion engine 10 (as will be called the "engine"), a motor generator (as will be tentatively called the "first motor generator" or "MG 1") 11, and a planetary gear mechanism 12 for synthesizing or distributing the torque between those internal combustion engine 10 and first motor generator 11. The engine 10 is a well-known power unit such as a gasoline engine or a diesel engine for outputting a power by burning a fuel, and is so constructed that its running state such as the degree of throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a permanent magnet type synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer. Here, a stator (a stator not shown) of the first motor generator 11 is so fixed as not to rotate.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The engine 10 has its output shaft connected through a damper 20 to that carrier 19 as a first rotary element. In other words, the carrier 19 acts as an input element.

On the other hand, a rotor (rotor not shown) of the first motor generator 11 is connected to the sun gear 17 as a second rotary element. Therefore, this sun gear 17 is the so-called "reaction element", and the ring gear 18 as a third rotary element is the output element. And, this ring gear 18 is connected to the output member (i.e., the output shaft) 2.

In the example shown in FIG. 3, on the other hand, the transmission 6 is constructed of one set of Ravignaux type planetary gear mechanisms. The planetary gear mechanism is provided with external gears, i.e., a first sun gear (S1) 21 and a second sun gear (S2), of which the first sun gear 21 meshes with a first pinion 23, which meshes with a second pinion 24, which meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the second pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the second pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing engaging forces by frictional forces, and can adopt a multi-disc engagement device or a band type engagement device. The brakes B1 and B2 are constructed to change their torque capacities continuously according to the engaging forces of oil pressures. Moreover, the aforementioned assist prime mover 5 is connected to the second sun gear 22, and the carrier 26 is connected to the output shaft 2. Furthermore, a parking gear 37 for putting the vehicle into a parking state is installed on the output shaft 2. Also, there is provided a parking lock pawl 38 for halting a rotation of the parking gear 37 by engaging therewith, in case a parking position is selected by a not shown shifting device.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the degree of accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here in the example shown in FIG. 3, there is adopted a motor generator (as will be tentatively called the "second motor generator" or "MG2") as the assist prime mover 5, which can have the power mode to output the torque and the regenerative mode to recover the energy. This second motor generator 5 is exemplified by a permanent magnet type synchronous electric motor and its rotor (rotor not shown) is connected to the second sun gear 22. Also, the second motor generator 5 is connected through an inverter 28 with a battery 29. Moreover, the motor generator 5 is constructed to control the power mode, the regenerative mode and the torques in the individual modes by controlling the inverter 28 with an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11. Additionally, a stator (a stator not shown) of the second motor generator 5 is so fixed as not to rotate.

Figure 5:
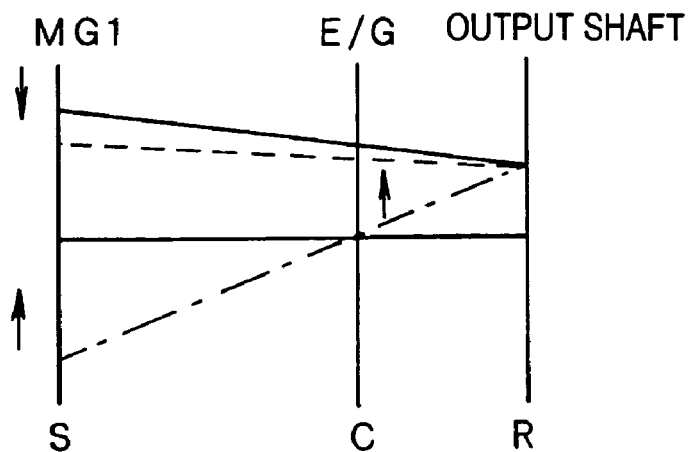
FIG. 5 is a nomographic diagram on the drive unit to which the invention is applied.
Figure 5:
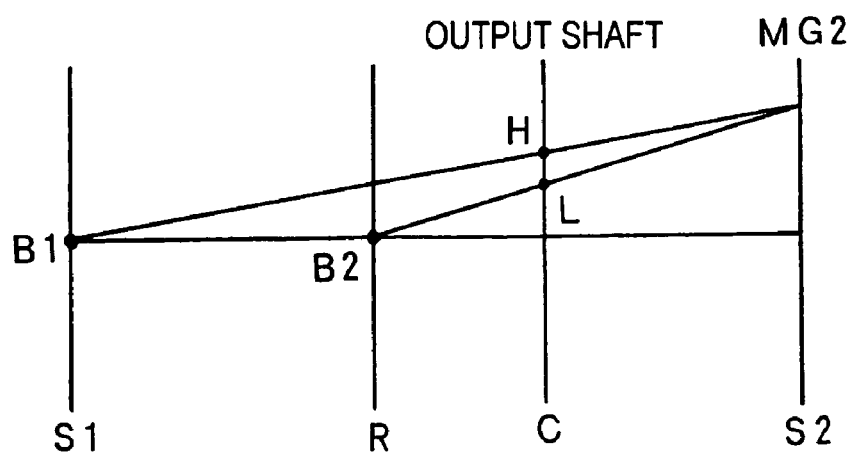

A nomographic diagram of the single pinion type planetary gear mechanism 12 as the aforementioned torque synthesizing/distributing mechanism is present at (A) in FIG. 5. When the reaction torque by the first motor generator 11 is inputted to the sun gear (S) 17 against the torque to be inputted to the carrier (C) 19 and outputted by the engine 10, a torque in the magnitude derived from an addition or subtraction of those torque appears at the ring gear (R) 18 acting as the output element. In this case, the rotor of the first motor generator 11 is rotated by this torque, and the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11.

As indicated by a chain line in FIG. 5 (A), moreover, the first motor generator 11 rotates backward when the engine 10 is halted while the vehicle is running. In this state, if the torque is outputted in a forward direction by operating the first motor generator 11 as the electric motor, the torque acts on the engine 10 connected to the carrier 19 to rotate it in the forward direction. As a result, the engine 10 can be started (i.e., motored or cranked) by the first motor generator 11. In this case, the torque acts on the output shaft 2 in the direction to stop the rotation of the output shaft 2. Therefore, the driving torque for running can be maintained by controlling the torque outputted from the second motor generator 5, and at the same time, the startup of the engine 10 can be executed smoothly. Here, the hybrid type of this kind is called "mechanical distribution type" or "split type".

On the other hand, a nomographic diagram of the Ravignaux type planetary gear mechanism constructing the transmission 6 is presented at (B) in FIG. 5. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

There is provided a hydraulic control system 31 for controlling the engagement/releases of the aforementioned individual brakes B1 and B2 by feeding/discharging the oil pressure thereto/therefrom. As shown in FIG. 11, the hydraulic control system 31 comprises a mechanical oil pump 32, an electric oil pump 33, and a hydraulic circuit 34. The hydraulic circuit 34 is constructed to regulate an oil pressure established by those oil pumps 32 and 33 to a line pressure, to feed and discharge the oil pressure regulated from the line pressure as an initial pressure to/from the brakes B1 and B2, and to feed a lubrication oil to requiring portions. The mechanical oil pump 32 is driven by the engine 10 to generates the oil pressure, and is arranged e.g., in an output side of the damper 20 and coaxially therewith. The mechanical oil pump 32 is operated by the torque of the engine 10. On the other hand, the electric oil pump 33 is driven by a motor 33M, and is arranged at a suitable place such as an outside of a casing (casing not shown). The electric oil pump 33 is operated by an electric power from an electric accumulator such as a battery to generate oil pressure.

The hydraulic circuit 34 comprises a plurality of solenoid valves, change-over valves or pressure regulator valves (those are not shown), and the regulation and the feeding/discharging of the oil pressure can be controlled electrically. Here, there are provided check valves 35 and 36 on a discharging side of the individual oil pumps 32 and 33. Those check valves 35 and 36 are opened by a discharging pressure of those oil pumps 32 and 33, and closed in an opposite direction. The oil pumps 32 and 33 are connected to the hydraulic circuit 34 and those pumps are arranged in parallel with each other. In addition, a valve for regulating the line pressure (valve not shown) controls the line pressure into two stages, such as, a high pressure stage by increasing the discharging amount, and a low pressure stage by decreasing the discharging amount.

The aforementioned hybrid drive unit comprises two prime movers such as the main prime mover 1 and the assist prime mover 5. The vehicle runs at low fuel consumption and at low emission by making good use of those prime movers. Even in case of driving the engine 10, moreover, the speed of the engine 10 is controlled at the optimum fuel consumption by the first motor generator 11. Moreover, inertia energy of the vehicle is regenerated as electric power at the coasting time. In case the torque is assisted by driving the second motor generator 5, the torque to be added to the output shaft 2 is augmented by setting the transmission 6 at the low gear stage L, when the vehicle speed is low. On the other hand, the speed of the second motor generator 5 is relatively lowered to reduce the loss by setting the transmission 6 at the high gear stage H when the vehicle speed is raised. Thus, the torque assist is carried out efficiently.

The aforementioned hybrid vehicle is capable of running by the power of the engine 10, by both of the engine 10 and the second motor generator 5, and only by the second motor generator 5. Those running pattern is determined and selected on the basis of drive demands represented by the accelerator opening, vehicle speed, and so on. For example, in case the battery charge is sufficient and the drive demand is relatively small, or in case a quiet start is selected by a manual operation, the running pattern is selected which is similar to that of an electric vehicle (as will be tentatively called "EV running") using the second motor generator 5, and the engine 10 is halted. In this state, in case the drive demand is increased when e.g., the accelerator pedal is depressed deeply, in case the battery charge is decreased, or in case the running state is shifted from the quiet start to a normal running by the manual operation, the engine 10 is started and the running pattern is shifted to the running pattern using the engine 10 (as will be tentatively called "E/G running").

In the aforementioned example, a startup of the engine 10 is carried out by the first motor generator 11 functioning as the motor, and by transmitting the torque to the engine 10 through the planetary gear mechanism 12 so as to carry out a motoring (or a cranking). In this case, if the torque is applied to the sun gear 17 by the first motor generator 11 in the direction to rotate the sun gear 17 forward, the torque acts on the ring gear 18 in the direction to rotate the ring gear 18 backward. Since the ring gear 18 is connected to the output shaft 2, the torque involved in the startup of the engine 10 acts in the direction to reduce the vehicle speed. At the startup of the engine 10, therefore, the torque is outputted from the second motor generator 5 in order to countervail a "reaction torque" (or to cancel the reaction force).

However, in case a trouble occurs in the electric oil pump 33 for some reasons, it is necessary to substitute the mechanical oil pump 32 for the electric oil pump 33 so as to generate the oil pressure by the mechanical oil pump 32. For this reason, a switching control of the oil pumps to be described is carried out.

Figure 1:
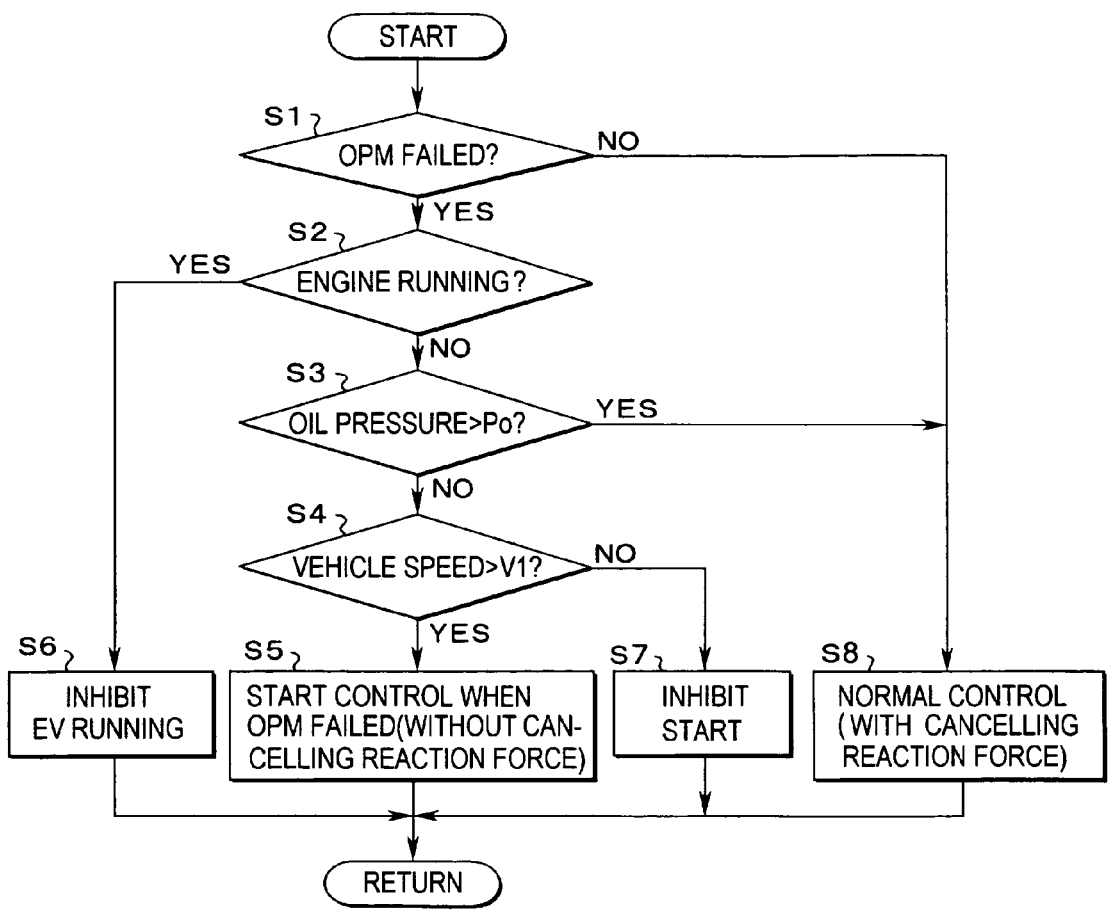
FIG. 1 is a flow chart for explaining a control example by a control system of this invention.
Figure 2:
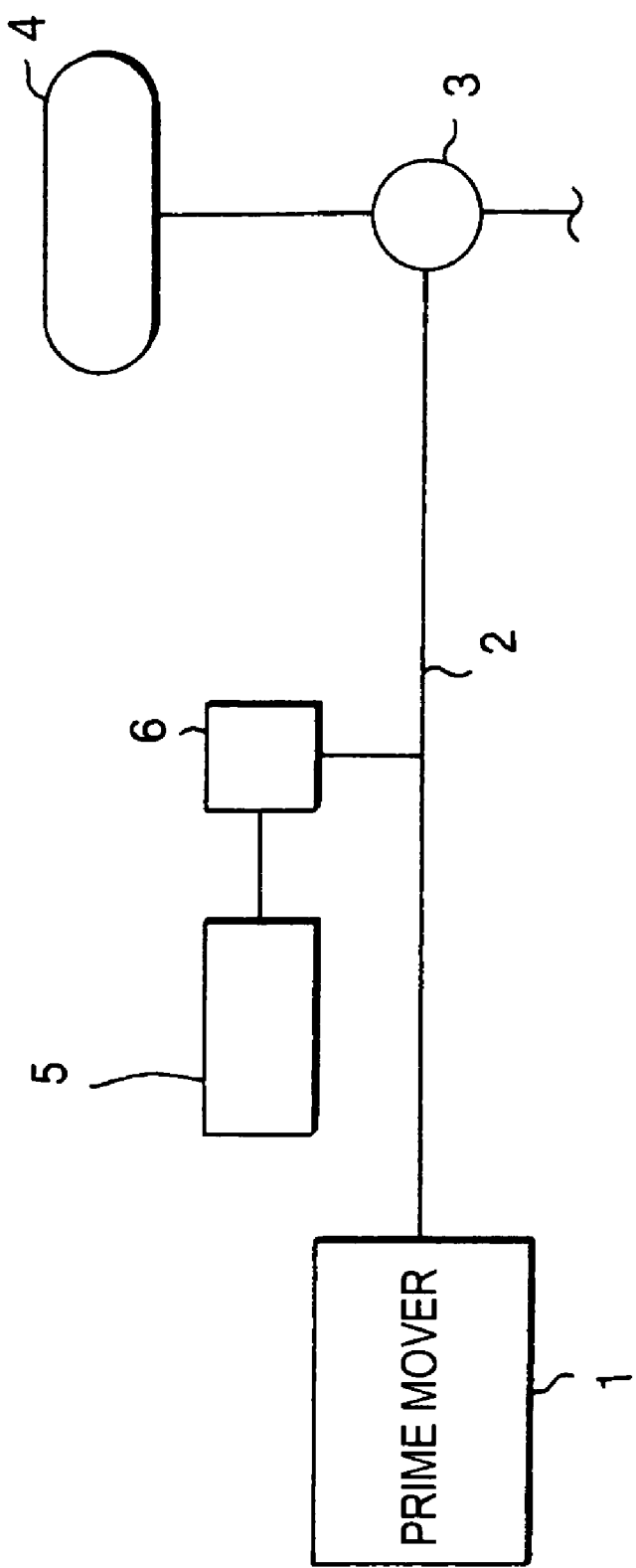
FIG. 2 is a diagram schematically showing a drive unit of a hybrid vehicle to which the invention is applied.

FIG. 1 is a flowchart for explaining an example of the above-mentioned control. First of all, it is judged (at Step S1) whether or not the electric oil pump 33 (OPM) fails, namely, it is judged whether or not the electric oil pump 33 is in an abnormal condition. This judgment is made by detecting an abnormality in a speed or a current value of the electric oil pump 33. In addition, this abnormality may be considered as a fail in case a preset time has elapsed from an instant when the abnormality in the speed or the current value is detected. If the electric oil pump 33 is in a proper working order, the answer of Step S1 is NO and an ordinary control including a reaction cancel is carried out (at Step S8).

On the contrary, in case the electric oil pump 33 have a trouble, specifically, in case the answer of Step Si is YES, it is judged (at Step S2) whether or not the vehicle is running by the engine 10 at that moment. In case the answer of Step S2 is YES, specifically, in case the vehicle is running by the engine 10 at that moment, the running by the second electric motor 5, i.e., EV running is inhibited, and the vehicle is run by the engine 10 (at Step S6). In this case, since the engine 10 is being operated, the oil pressure is fed by the mechanical oil pump 32 which is connected with the engine 10.

On the contrary, in case the answer of Step S2 is NO, specifically, in case of EV running, it is judged (at Step S3) whether or not the oil pressure to be fed is higher than a preset value Po. In case the answer of Step S3 is YES, specifically, in case the oil pressure of the transmission 6 is judged as insufficient, the ordinary control including a reaction cancel is carried out (at Step S8).

In case the answer of Step S3 is NO, specifically, in case the oil pressure of the transmission 6 is insufficient, it is judged (at Step S4) whether or not the current speed of the vehicle is higher than a preset value V1. In case the answer of Step S4 is NO, specifically, in case the vehicle speed is slow, a main switch for the entire vehicle (or a start switch) is turned off and a startup of the entire vehicle is inhibited (at Step S7).

On the contrary, in case the answer of Step S4 is YES, specifically, in case the vehicle speed is high, a start control without canceling of the reaction force is carried out (at Step S5). If a required torque for canceling the reaction force is applied to the transmission 6, a slippage occurs in the transmission 6 and this may cause a trouble such as a seizing may occur because the torque capacity is reduced as a result of drop of the oil pressure. This is the reason for not canceling the reaction force, and the second motor generator is therefore prevented from outputting the torque. Consequently, the transmission 6 is prevented from being seized.

Accordingly, in case the trouble of the electric oil pump 33 is detected, the engine 10 is driven. Therefore, the vehicle can be run by the engine 10 even if the electric oil pump 33 fails.

Moreover, the oil pressure is fed by the mechanical oil pump 32 which is connected with the engine 10, even in case the trouble of the electric oil pump 33 is detected. Therefore, it is possible to continue to feed the oil pressure to the transmission 6 even if the electric oil pump 33 fails.

Still moreover, the reaction force is cancelled by the second motor generator 5 at the cranking time of the engine 10, while the torque capacity of the transmission 6, i.e., the oil pressure being fed is higher than the preset value. Therefore, it is possible to cancel the torque transmitted at the cranking time from the engine 10 side to the output shaft 2, by the torque of the second motor generator 5.

Furthermore, propriety of driving the engine 10 is determined on the basis of the vehicle speed. Therefore, it is possible to start the engine 10 at the vehicle speed in which the torque fluctuations are not felt easily.

Additionally, the engine 10 is inhibited from driving at a low vehicle speed, and is driven at a high vehicle speed.

Therefore, it is possible to start the engine 10 when the high vehicle speed is high so that the torque fluctuations are not felt easily.

Here will be briefly described the relations between the aforementioned specific example and this invention. The functional means of Step S1 or the electronic control unit for providing the same function corresponds to "the trouble detecting means" of the invention; the functional means of Steps S5 and S6 or the electronic control unit for providing the same function correspond to "the internal combustion engine starting means" of the invention; and the functional means of Step S5 or the electronic control unit for providing the same function corresponds to "the mechanical oil pump operating means" of the invention. Also, the functional means of Step S8 or the electronic control unit for providing the same function corresponds to "the torque output control means" of the invention; and the functional means of Step S4 or the electronic control unit for providing the same function corresponds to "starting propriety determining means" of th invention.

What is claimed is:

1. A control system for a hybrid vehicle, in which an internal combustion engine is connected to a first electric motor and to an output member through a power distributing mechanism, in which a second electric motor is connected to an output member through a transmission wherein a torque capacity is varied in accordance with an oil pressure, and which has an electric oil pump for generating an oil pressure to set the torque capacity of the transmission, comprising:
    a trouble detecting means for detecting a trouble of the electric oil pump; and
    an internal combustion engine starting means for starting the internal combustion engine in case the trouble is detected by the trouble detecting means.

2. The control system for a hybrid vehicle according to claim 1,
    wherein the trouble detecting means includes a means for detecting the trouble on the basis of a speed or an abnormality of a current value of the electric oil pump, or an elapsed time from the instant when the trouble has occurred.

3. The control system for a hybrid vehicle according to claim 1, further comprising:
    an electrical running inhibiting means for inhibiting a running by the second electric motor in case the trouble is detected by the trouble detecting means.

4. The control system for a hybrid vehicle according to claim 1, further comprising:
    a mechanical oil pump which is driven by the internal combustion engine, for generating an oil pressure to set a torque capacity of the transmission; and
    a mechanical oil pump operating means for feeding an oil pressure from the mechanical oil pump to the transmission, in case the trouble is detected by the trouble detecting means.

5. The control system for a hybrid vehicle according to claim 1,
    wherein the internal combustion engine starting means includes:
        a cranking means for cranking the internal combustion engine by the first electric motor; and
        a torque output control means for outputting a torque by the second electric motor while the oil pressure of the transmission is higher than a preset value.

6. The control system for a hybrid vehicle according to claim 1, further comprising:
    a starting propriety determining means for determining to allow or not to allow a cranking of the internal combustion engine by the internal combustion engine starting means on the basis of the vehicle speed.

7. The control system for a hybrid vehicle according to claim 6,
    wherein the starting propriety determining means includes a means for inhibiting the cranking at a low vehicle speed, and for allowing the cranking at a high vehicle speed.

8. The control system for a hybrid vehicle according to claim 6,
    wherein the starting propriety determining means includes a means for inhibiting a startup of the hybrid vehicle at a low vehicle speed.

9. The control system for a hybrid vehicle according to claim 1,
    wherein the power distributing mechanism includes a gear mechanism for performing a differential action to distribute an output torque of the internal combustion engine to the first electric motor and the output member.

10. The control system for a hybrid vehicle according to claim 9, further comprising:
    a fixing mechanism for halting a rotation of the output member, in case of cranking the internal combustion engine by the first electric motor.

11. The control system for a hybrid vehicle according to claim 9,
    wherein the gear mechanism includes a planetary gear mechanism, comprising;
        an input element to which the torque of the internal combustion engine is inputted,
        a reaction element to which the first motor generator is connected, and
        an output element to which the output member is connected.

12. The control system for a hybrid vehicle according to claim 9,
    wherein the gear mechanism includes a single pinion type planetary gear mechanism, comprising;
        a carrier to which the torque of the internal combustion engine is inputted,
        a sun gear to which the first motor generator is connected, and
        a ring gear to which the output member is connected.

13. The control system for a hybrid vehicle according to claim 1,
    wherein the transmission includes a mechanism capable of switching a gear ratio at least between high and low.

14. The control system for a hybrid vehicle according to claim 13,
    wherein the mechanism includes a Ravigneaux type planetary gear mechanism.

15. The control system for a hybrid vehicle according to claim 1, wherein the transmission comprises:
    a first sun gear which is fixed selectively,
    a ring gear which is arranged concentrically with the first sun gear,
    a first pinion gear which meshes with the first sun gear,
    a second pinion gear which meshes with the first pinion gear and the ring gear,
    a carrier which holds those pinion gears, and which is connected to the output member, and
    a second sun gear which meshes with the second pinion gear, and to which the second electric motor is connected.

16. A control system for a hybrid vehicle, in which an internal combustion engine is connected to a first electric motor and to an output member through a power distributing mechanism, in which a second electric motor is connected to an output member through a transmission wherein a torque capacity is varied in accordance with an oil pressure, and which has an electric oil pump for generating an oil pressure to set the torque capacity of the transmission, comprising:
- a trouble detecting device for detecting a trouble of the electric oil pump; and
- an internal combustion engine starting device for starting the internal combustion engine in case the trouble is detected by the trouble detecting device.

17. The control system for a hybrid vehicle according to claim 16, comprising:
- a mechanical oil pump which is driven by the internal combustion engine, for generating an oil pressure to set a torque capacity of the transmission; and
- a mechanical oil pump operating device for feeding an oil pressure from the mechanical oil pump to the transmission, in case the trouble is detected by the trouble detecting device.

18. The control system for a hybrid vehicle according to claim 16,
wherein the internal combustion engine starting device includes:
- a cranking device for cranking the internal combustion engine by the first electric motor; and
- a torque output control device for outputting a torque by the second electric motor while the oil pressure of the transmission is higher than a preset value.

19. The control system for a hybrid vehicle according to claim 16, further comprising:
- a starting propriety determining device for determining to allow or not to allow a startup of the internal combustion engine on the basis of the vehicle speed.

20. The control system for a hybrid vehicle according to claim 19,
wherein the starting propriety determining device includes a device for inhibiting the cranking at a low vehicle speed, and for allowing the cranking at a high vehicle speed.

21. A control method for a hybrid vehicle, in which an internal combustion engine is connected to a first electric motor and to an output member through a power distributing mechanism, in which a second electric motor is connected to an output member through a transmission wherein a torque capacity is varied in accordance with an oil pressure, and which has an electric oil pump for generating an oil pressure to set the torque capacity of the transmission, comprising:
- a step of detecting a trouble of the electric oil pump; and
- a step of starting the internal combustion engine in case the trouble is detected.

* * * * *